United States Patent [19]
Takubo et al.

[11] Patent Number: 4,819,505
[45] Date of Patent: Apr. 11, 1989

[54] BALANCER SHAFTS FOR USE IN MULTICYLINDER ENGINES

[75] Inventors: Hiroichi Takubo, Miyanomachi; Kazuo Isayama, Hamadahonmachi; Syoji Yamashita, Kure, all of Japan

[73] Assignee: Mazda Motor Corporation, Japan

[21] Appl. No.: 13,930

[22] Filed: Feb. 11, 1987

[30] Foreign Application Priority Data

Feb. 19, 1986 [JP] Japan .................................. 61-35886
Mar. 5, 1986 [JP] Japan .................................. 61-47956

[51] Int. Cl.$^4$ .............................................. F16H 37/06
[52] U.S. Cl. ...................................... 74/603; 74/604; 123/192 B
[58] Field of Search ............. 74/603, 604, 572, 573 R, 74/574; 123/192 B, 192 R

[56] References Cited

U.S. PATENT DOCUMENTS

| | | | |
|---|---|---|---|
| 4,028,963 | 6/1977 | Nakamura et al. | 74/604 |
| 4,351,202 | 9/1962 | Summers | 123/192 R |
| 4,523,553 | 6/1985 | Backlund | 74/604 |
| 4,538,481 | 9/1985 | Ohta et al. | 123/192 B |
| 4,552,104 | 11/1985 | Hara et al. | 74/603 |
| 4,569,316 | 2/1986 | Suzuki | 74/604 |
| 4,644,916 | 2/1987 | Kitagawa | 123/192 B |
| 4,651,689 | 3/1987 | Feichtinger | 123/192 B |
| 4,688,528 | 8/1987 | Nivi et al. | 74/603 |

FOREIGN PATENT DOCUMENTS

| | | | |
|---|---|---|---|
| 56-62455 | 5/1981 | Japan | 74/604 |
| 0098242 | 6/1985 | Japan | 74/604 |
| 2169035 | 7/1986 | United Kingdom | 74/604 |

Primary Examiner—Richard E. Moore
Assistant Examiner—Vinh Luong
Attorney, Agent, or Firm—Gerald J. Ferguson, Jr.

[57] ABSTRACT

A balancer shaft for use in a multicylinder engine comprises a balance weight part formed to be eccentric in relation to a rotation axis of the balancer shaft and disposed along the alignment of cylinders in a cylinder block, an elongated shaft part extending from the balance weight part along the alignment of cylinders, a driving device provided on an end portion of the elongated shaft part for transmitting the rotation of a crank shaft in the cylinder block to the balancer shaft, a first journal provided on the end portion of said elongated shaft part, a second journal provided on a central portion of the balance weight part, and a third journal provided on an end portion of the balance weight part. The first, second and third journals are supported respectively by first, second and third bearing portions provided in the cylinder block.

10 Claims, 3 Drawing Sheets

BALANCER SHAFTS FOR USE IN MULTICYLINDER ENGINES

BACKGROUND OF THE INVENTION

1. Field of the Invention

The present invention relates generally to balancer shaft for use in multicylinder engines, and more particularly, to a balancer shaft provided with improved journals each turning in a bearing for use in a reciprocating piston engine of the multicylinder type.

2. Description of the Prior Art

In a reciprocating piston engine, a crank arm mounted rotatably on a crank shaft is provided with a balance weight for the purpose of suppressing engine vibrations which result from centrifugal force working on portions rotating eccentrically such as the crank arm and a crank pin or inertia force working on reciprocating portions such as a piston and a piston pin. The balance weight provided on the crank arm is generally contributive to cancel the engine vibrations. In a four-cycle, four-cylinder engine of the straight type, which is a fundamental form of the reciprocating piston engine, however, a secondary vibration of the engine at the frequency being twice as high as that of the revolution of the crank shaft, which results from inertia force working on reciprocating portions in the engine, is not sufficiently cancelled only by the balance weight provided on the crank arm.

With the view of suppressing such a secondary vibration of the engine, there has been proposed a balancing device employing a balancer shaft disposed to be rotatable in an engine, as disclosed in, for example, U.S. Pat. 4,028,963 which corresponds to the Japanese patent specification published after examination under publication No. 57-44863. The balancer shaft has a balance weight part and is arranged in parallel with a crank shaft to be driven thereby through a driving mechanism. When the balance weight part is provided on the balancer shaft in an appropriate form and balancer shaft is revolved at speed being twice as high as that of the crank shaft in the event of the four-cycle, four-cylinder engine of the straight type, the secondary vibration of the engine resulting from inertia force working on the reciprocating portions in the engine as mentioned above is cancelled.

In an engine equipped with such a balancing device, it is desirable that the balance weight part of the balancer shaft is disposed at a central area in the engine in the direction along the crank shaft and further journals of the balancer shaft are supported by bearings each provided at a portion of the engine that has high rigidity, namely, a bulkhead at a front or rear end or between cylinders in the engine, in order to avoid another vibration caused by the revolution of the balancer shaft with the balance weight part. Accordingly, in connection with the balance weight part and journals of the balancer shaft, such arrangements as shown in FIGS. 1 and 2 have been proposed as disclosed in also the aforementioned U.S. patent and further an arrangement using a balancer shaft having four journals, such as shown in the Japanese utility model specification published before examination under publication No. 56-62455, has been considered as shown in FIG. 3.

Figure 1:
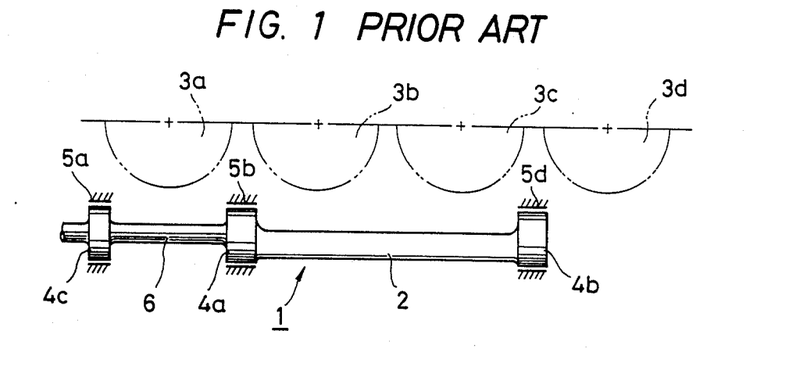
FIGS. 1, 2 and 3 are schematic illustrations showing previously proposed balancer shafts, respectively.

In the arrangement shown in FIG. 1, a balance weight part 2 of a balancer shaft 1 is disposed by the side of the second and third cylinders 3b and 3c which are positioned at the central area in an engine in the direction along a crank shaft, and the first and second journals 4a and 4b are provided on both end portions of the balance weight part 2 of the balancer shaft 1 to be supported by bearings provided in a bulkhead 5b between the first and second cylinders 3a and 3b and a bulkhead 5d between the third and fourth cylinders 3c and 3d, respectively. Further, an elongated shaft part 6 extends from the end portion of the balance weight part 2, at which the first journal 4a is provided, to engage with a driving mechanism (not shown in FIG. 1), and a third journal 4c is provided on the end portion of the elongated shaft part 6 to be supported by a bearing provided in a bulkhead 5a at the front end portion of a cylinder block.

Figure 2:
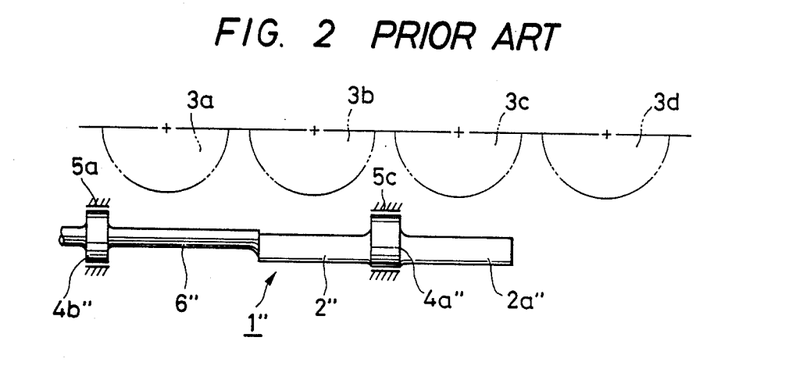

In the arrangement shown in FIG. 2, a balancer shaft 1" has a balance weight part 2" corresponding to the balance weight part 2" of FIG. 1, which is provided with a first journal 4a" on the central portion thereof without any journal at both side portions thereof. The balancer shaft 1" is provided also with an elongated shaft part 6" corresponding to the elongated shaft part 6 of FIG. 1 and a second journal 4b" provided on the end portion of the elongated shaft part 6". The first and second journals 4a" and 4b" are supported by bearings provided in a bulkhead 5c between the second and third cylinders 3b and 3c and in a bulkhead 5a at the front end portion of a cylinder block, respectively.

Figure 3:
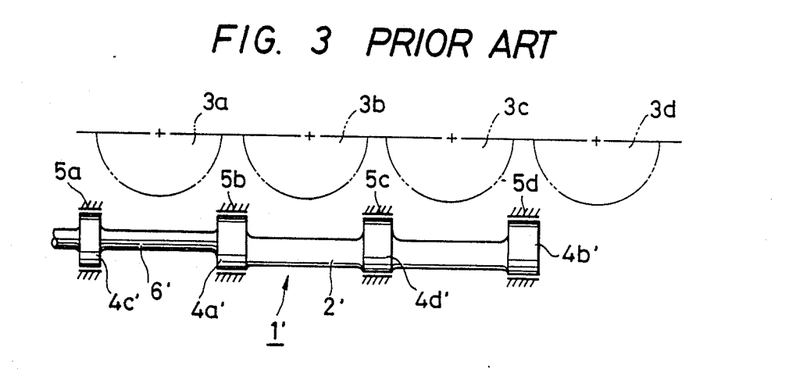

Further, in the arrangement shown in FIG. 3, a balancer shaft 1' has a balance weight part 2' corresponding to the balance weight part 2 of FIG. 1, which is provided with first and second journals 4a' and 4b' at both side portions thereof, respectively, and an elongated shaft part 6' corresponding to the elongated shaft part 6 of FIG. 1, which is provided with a third journal 4c' at the end portion thereof. In addition, a fourth journal 4d' is provided on the central portion of the balance weight part 2'. The first to fourth journals 4a' to 4d' are supported by bearings in a bulkhead 5b between the first and second cylinders 3a and 3b, a bulkhead 5b between the third and fourth cylinders 3c and 3d, a bulkhead 5a in the front end portion of a cylinder block, and a bulkhead 5c between the second and third cylinders 3b and 3c, respectively.

However, there are the following problems in these arrangements shown in FIGS. 1 to 3. That is, in the arrangement shown in FIG. 1, since the balance weight part 2 has a relatively long span between the first and second journals 4a and 4b and therefore a relatively large bending moment resulting from centrifugal force works on the balance weight part 2, each of the first and second journals 4a and 4b or each of the bearings supporting the first and second journals 4a and 4b is apt to wear partially or seize. In the arrangement shown in FIG. 2, a bending moment working on the balance weight part 2' is reduced due to the first journal 4a" provided on the central portion of the balance weight part 2" to be supported by the bearing provided in the bulkhead 5c. However, since a half 2a" of the balance weight part 2" on the side opposite to the elongated shaft part 6" is substantially cantilevered and therefore swung with its revolutions, the first journal 4a" or the bearing supporting the first journal 4a" is apt to be aggravated to wear partially. Further, in the arrangement shown in FIG. 3, a bending moment working on the balance weight part 2' is reduced due to the fourth journal 4d' provided on the central portion of the balance weight part 2' to be supported by the bearing provided in the bulkhead 5c and the balance weight part 2' is prevented from swinging with its revolutions by the first and second journals 4a' and 4b' which are provided at both end portions of the balance weight part 2' to be supported by the bearings provided in the bulkheads 5b and 5d, respectively. However, the total amount of driving power loss resulting from resistance against sliding at each of the first to fourth journals 4a' to 4d' is increased in comparison with the other arrangements.

Incidentally, in general, each of a plurality of journals provided on a balancer shaft has the same diameter usually, and consequently it is not easy to cause the balancer shaft to engage with a cylinder block in such a manner that each of the journals on the balancer shaft is inserted correctly into corresponding one of bearings provided in a plurality of bulkheads of the cylinder block. Moreover, since the diameter of each of the journals is selected to be relatively large in order to permit the balance weight part to rotate eccentrically, the outer surface of each of the journals moves to slide on the inner surface of the corresponding bearing at relatively high speed and therefore each of the journals or the bearing engaging therewith tends furthermore to wear partially or seize.

OBJECTS AND SUMMARY OF THE INVENTION

Accordingly, it is an object of the present invention to provide a balancer shaft for use in a multicylinder engine, which avoids the foregoing problems encountered with the prior art.

Another object of the present invention is to provide a balancer shaft for use in a multicylinder engine, which can reduce driving power loss and be liberated from a fear of undesirable partial wear or seizure caused on journal portions provided thereon.

A further object of the present invention is to provide a balancer shaft for use in a multicylinder engine, which can be easily engaged with a cylinder block of the engine in such a manner that each of journals provided on the balancer shaft is inserted correctly into corresponding one of bearing portions provided in the cylinder block.

According to the present invention, there is provided a balancer shaft for use in a multicylinder engine, which is sustained by a cylinder block of the engine to be arranged in substantial parallel with a crank shaft in the engine and driven to rotate by the crank shaft, comprising a balance weight part formed to be eccentric in relation to a rotation axis of the balancer shaft and disposed at a central area in the cylinder block in the direction along the alignment of cylinders, an elongated shaft part having one end portion connected with one end portion of the balance weight part and extending therefrom in the direction along the alignment of cylinders with an axis coinciding with the rotation axis of the balancer shaft, a driving device provided on the other end portion of the elongated shaft part for transmitting the rotation of the crank shaft to the balancer shaft, a first journal provided on the other end portion of the elongated shaft part to be supported to turn by a first bearing portion provided in the cylinder head, a second journal provided on a central portion of the balance weight part to be supported to turn by a second bearing portion provided in the cylinder block, and a third journal provided on the other end portion of the balance weight part to be supported to turn by a third bearing portion provided in the cylinder block.

In an embodiment of balancer shaft according to the present invention taken by way of example, the first journal which is positioned to be more distant than the third journal from the second journal is so formed that at least one of the lengths thereof, either along the rotation axis of the balancer shaft or the diameter is larger than the corresponding length of the third journal.

In another embodiment, the second journal is provided with the radius thereof larger than a maximum distance from the rotation axis of the balancer shaft to the outer surface of the balance weight part and the third journal is provided with the diameter thereof smaller than that of the second journal.

In another aspect of the invention, the balance weight part is so formed that a first section thereof which is disposed between the first and second journals is weightier than a second section thereof which is disposed between the second and third journals.

With the balancer shaft thus constituted in accordance with the present invention, a bending moment resulting from centrifugal force to work on the balance weight part is restrained by the second journal provided on the central portion of the balance weight part, and the balance weight part is surely prevented from swinging with its revolution by the first and third journals provided at both end portions thereof. Accordingly, each of the first, second and third journals or each of the bearing portions supporting the first, second and third journals is liberated from a fear of undesirable partial wear or seizure.

Further, since only the first, second and third journals are provided on the balancer shaft, the total amount of driving power loss resulting from resistance against sliding at each journal is restricted to be relatively small.

With the embodiment wherein the first journal, which is provided on the end of a first portion of the balancer shaft which includes a first section of the balance weight part and the elongated shaft part and therefore receives a larger bending moment compared with a second portion of the balancer shaft which includes a second section of the balance weight part and the third journal provided on the end thereof, is so formed that at least one of the length thereof and the diameter thereof is larger than that of the third journal, a load imposed on a unit area on the first journal and a load imposed on a unit area on the third journal are equalized with each other. Consequently, wears caused respectively on the first and third journals are also equalized with each other, and the durability of the balancer shaft is improved.

With the embodiment wherein the second journal is provided with its radius larger than a maximum distance from the rotation axis of the balancer shaft to the outer surface of the balance weight part and the third journal is provided with the diameter thereof smaller than that of the second journal, the second journal can be easily inserted into the second bearing portion provided in, for example, a bulkhead between the cylinders in the cylinder block so as to be supported by the latter. In addition, the embodiment is easily engaged with the cylinder block in such a manner that the first, second and third journals are are inserted correctly into the first, second and third bearing portions, respectively, by putting the same into the cylinder block with the third journal at the front end thereof. Besides, since the diameter of the third journal is selected to be relatively small, the outer surface of the third journal moves to slide on the inner surface of the third bearing portion at relatively low speed and therefore the driving power loss is reduced furthermore at the third journal.

Further, with the embodiment wherein the balance weight part is so formed that the first section thereof disposed between the first and second journals is weightier than the second section thereof disposed between the second and third journals, such an advantage as explained below is obtained.

Figure 4:
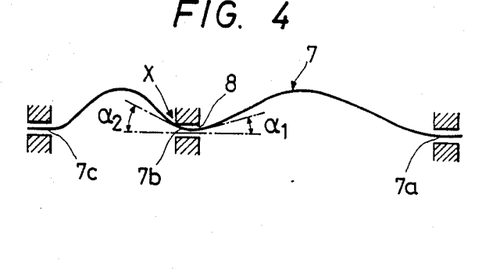
FIGS. 4 and 5 are schematic illustrations used for explanation of an advantage obtained with one embodiment of balancer shaft used in a multicylinder engine according to the present invention.

Generally, when the balancer shaft having the balance weight part formed to be eccentric in relation to the rotation axis of the whole shaft, the elongated shaft part connected in series to the balance weight part with its axis coinciding with the rotation axis of the whole shaft, and the first, second and third journals provided on both end portions of the whole shaft and the central portion of the balance weight part, respectively, is revolved at relatively high speed, centrifugal force resulting from the eccentric revolution of the balance weight part works on the balance weight part so as to cause the same to bend. In such a case, assuming that the balance weight part is so formed that both first and second sections disposed between the first and second journals and between the second and third journals, respectively, are equal in weight to each other, as schematically shown in FIG. 4, even though the amount of maximum flexion on a first portion of the balancer shaft 7 extending from the second journal 7b to the first journal 7a is equal to or a little larger than the amount of maximum flexion on a second portion of the balancer shaft 7 extending from the second journal 7b to the third journal 7c, a bending angle $\alpha_1$ of the first portion of the balancer shaft 7 at one side of the second journal 7b becomes smaller than a bending angle $\alpha_2$ of the second portion of the balancer shaft 7 at the other side of the second journal 7b. Then, in the case where the difference between the bending angle $\alpha_1$ and the bending angle $\alpha_2$ is in excess of a predetermined value, the second journal 7b comes undesirably into contact with the inner surface of the bearing portion 8, which supports the second journal 7b through a predetermined oil clearance, at the side of the second portion of the balancer shaft 7 as indicated with X in FIG. 4, and as a result, wears partially and abnormally or causes seizure thereon.

Figure 5:
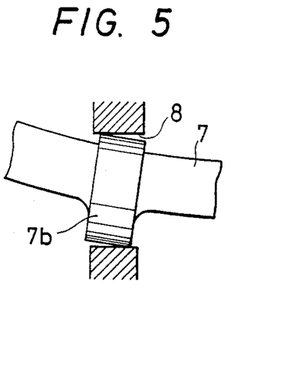

Further, in the case where the second journal 7b is formed to have high rigidity and therefore not bent in itself, portions of the second journal 7b come into contact with the inner surface of the bearing portion 8 in such an undesirable manner as shown in FIG. 5, and consequently the second journal 7b wears also partially and abnormally.

To the contrary, in the above mentioned embodiment wherein the balance weight part is so formed that the first section thereof disposed between the first and second journals is weightier than the second section thereof disposed between the second and third journals, the amount of maximum flexion on a first portion of the balancer shaft extending from the second journal to the first journal is increased relatively to the amount of maximum flexion on a second portion of the balancer shaft extending from the second journal to the third journal, so that bending angles of the first and second portions of the balancer shaft corresponding to the bending angles $\alpha_1$ and $\alpha_2$ shown in FIG. 4, respectively, are made substantially equal to each other. This results in the advantage that such undesirable partial wear or seizure caused on the second journal as described above is avoided.

The above, and other objects, features and advantages of the present invention will become apparent from the following detailed description which is to be read in conjunction with the accompanying drawings.

DESCRIPTION OF THE PREFERRED EMBODIMENTS

Figure 6:
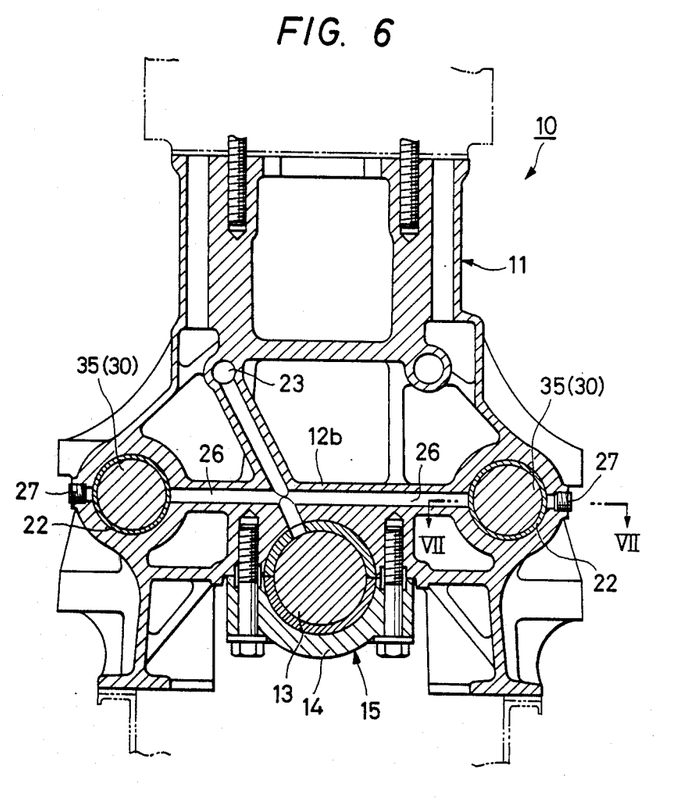
FIG. 6 is a schematic cross-sectional view showing an engine to which one embodiment of balancer shaft used in a multicylinder engine according to the present invention is applied.
Figure 7:
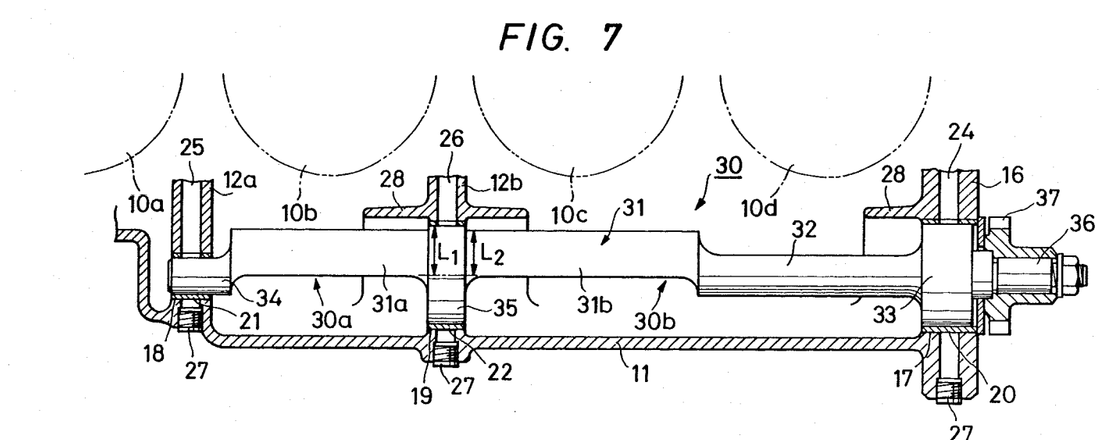
FIG. 7 is a schematic partial cross-sectional view taken along line VII—VII on the engine shown in FIG. 6.

FIGS. 6 and 7 show an embodiment of balancer shaft for use in a multicylinder engine according to the present invention, which is applied to a four-cycle, four-cylinder engine of the straight type.

Referring to FIGS. 6 and 7, a four-cycle, four-cylinder engine 10 of the straight type has a cylinder block 11 in which four cylinders 10a, 10b, 10c and 10d are arranged in line. The cylinder block 11 is provided with a plurality of bulkheads including a bulkhead 12a located between the cylinders 10a and 10b and a bulkhead 12b located between the cylinders 10b and 10c. A crank shaft 13 is disposed at the central area in a lower portion of the cylinder block 11 to elongate along the alignment of the cylinders 10a to 10d. Each of the crank journals of the crank shaft 13 is supported by a main bearing 15 composed of the lower end portion of the bulkhead located between two of the cylinders 10a to 10d adjoining each other or a front or rear end wall of the cylinder block 11 and a bearing cap 14 coupled thereto. The crank shaft 13 is further provided with a plurality of crank arms supporting four crank pins, with each of which a piston in each of the cylinders 10a to 10d is rotatably engaged.

In the cylinder block 11, a pair of balancer shafts 30 are disposed to face each other with the crank shaft 13 between. The balancer shafts 30 are sustained by the cylinder block 11 to extend respectively in substantial parallel with the crank shaft 13 and are driven to rotate in the respective directions opposite to each other at speed being twice as high as the speed of rotation of the crank shaft 13.

Each of the balancer shafts 30 comprises a balance weight part 31 which is formed to be eccentric in relation to a rotation axis of the balancer shaft 30 and to have a cross section in the shape of a semicircle, and an elongated shaft part 32 which has one end portion thereof connected with one end portion of the balance weight part 31 and extends therefrom with an axis coinciding with the rotation axis of the balancer shaft 30. Further, the balancer shaft 30 is provided with a first journal 33 on the other end portion of the elongated shaft part 32, a second journal 35 on a central portion of the balance weight part 31, and a third journal 34 on the other end portion of the balance weight part 31. The balance weight part 31 is disposed by the side of the cylinders 10b and 10c which are positioned at a central area in the cylinder block 11 in the direction along the alignment of cylinders 10a to 10d. The first journal 33 is supported to be rotatable through a bearing metal 20 by a first bearing 17 provided in an end wall 16 of the cylinder block 11, and the second and third journals 35 and 34 are supported to be rotatable through bearing metals 22 and 21 by second and third bearings 19 and 18 provided in the bulkheads 12b and 12a, respectively. The balancer shaft 30 is further provided with an axis end portion 36 projecting from the other end portion of the elongated shaft part 32 and a gear 37 is mounted on the axis end portion 36 to constitute a driving device for transmitting the rotation of the crank shaft 13 to the balancer shaft 30.

The end wall 16 and the bulkheads 12b and 12a are provided therein respectively oil passages 24, 26 and 25 each extending from an oil gallery 23 shown in FIG. 6, so that the first, second and third journals 33, 35 and 34 and the bearing metals 20, 22 and 21 in the first, second and third bearings 17, 19 and 18 are lubricated with lubricating oil supplied through the oil passages 24, 26 and 25, respectively. Each of end portions the oil passages 24, 26 and 25 is closed down by a blind plug 27. The end wall 16 and the bulkhead 12a are further provided thereon with baffles 28 covering the first and second bearings 17 and 19, respectively, to prevent the lubricating oil flowing out of the first and second bearings 17 and 19 from scattering in the cylinder block 11.

The first journal 33 which is positioned on the other end portion of the elongated shaft part 32 to be more distant than the third journal 34 from the second journal 35 is so formed that the length thereof along the rotation axis of the balancer shaft 30 is larger than that of the third journal 34 and the diameter thereof is larger than that of the third journal 34 and accordingly the area of the outer surface of the first journal 33 engaging with the bearing metal 20 in the first bearing 17 is greater than the area of the outer surface of the third journal 34 engaging with the bearing metal 21 in the third bearing 18. In this connection, apart from the above, the first journal 33 may be so formed that the length thereof is larger than that of the third journal 34 or the diameter thereof is larger than that of the third journal 34, so as to have the area of the outer surface thereof greater than the area of the outer surface of the third journal 34.

The second journal 35 positioned on the central portion of the balance weight part 31 is provided with its radius ($L_1$ in FIG. 7) larger than a maximum distance ($L_2$ in FIG. 7) from the rotation axis of the balancer shaft 30 to the outer surface of the balance weight part 31. The third journal 34 positioned on the other end portion of the balance weight part 31 is provided with the diameter thereof smaller than that of the second journal 35.

Further, the balance weight part 31 is so formed that a first section 31b thereof constituting partially a first portion 30b of the balancer shaft 30 which extends from the second journal 35 to the first journal 33 is weightier than a second section 31a thereof constituting a second portion 30a of the balancer shaft 30 which extends from the second journal 35 to the third journal 34 and is shorter than the first portion 30b of the balancer shaft 30. To achieve this, for example, the first and second sections 31b and 31a of the balance weight part 31 are provided with the same area of cross-section, and the first section 31b is made larger in length along the rotation axis of the balancer shaft 30 than the second section 31a.

With the configuration thus constituted, when the engine 10 operates, a secondary vibration of the engine 10 which results from inertia force working on reciprocating portions in the engine 10 is sufficiently suppressed by means of the balancer shafts 30, as described below.

Since the balancer shafts 30 are disposed symmetrically on the right and left sides of the crank shaft 13, respectively, to extend substantially parallel with the crank shaft 13 and are driven to rotate in the respective directions opposite to each other at speed being twice as high as the speed of rotation of the crank shaft 13, a resultant of centrifugal forces working respectively on the balance weight parts 31 of the balancer shafts 30 varies in its direction every period corresponding to a half of the rotation period of the crank shaft 13. Accordingly, vibromotive force resulting from inertia force working on reciprocating portions in the engine 10 is cancelled by the resultant of centrifugal forces working on the balance weight parts 31 of the balancer shafts 30 under a condition wherein the phase of rotation of each of the balancer shafts 30 is selected appropriately. In such a case, since the balancer shafts 30 are disposed symmetrically on the right and left sides of the crank chaft 13, respectively, and are rotated at the same speed in the opposite directions, respectively, another vibromotive force resulting from some components of the centrifugal forces working on the balance weight parts 31 of the balancer shafts 30 is not produced. Further, since each of the balance weight parts 31 of the balancer shafts 30 is disposed at the central area in the cylinder block 11 in the direction along the alignment of cylinders 10a to 10d of the engine 10, a pitching moment resulting from the centrifugal force working on each of the balance weight parts 31 of the balancer shafts 30 is prevented from working on the engine 10. Consequently, vibrations of the engine 10 are effectively suppressed.

Then, each of the balance weight parts 31 of the balance shafts 30 is provided on its central portion with the second journal 35 to be supported by the second bearing 19 and therefore a bending moment working on the balance weight part 31 is suppressed, so that loads imposed upon the first and third journals 33 and 34 provided at both end portions of the balancer shaft 30 and the first and third bearings 17 and 18 supporting the first and third journals 33 and 34 are reduced. Further, since the third journal 34 is provided on the end portion of the balance weight part 31 to be supported by the third bearing 18, the balance weight part 31 is prevented from swinging with its revolutions and therefore a load imposed upon the second journal 35 and the second bearings 19 supporting the second journal 35 is also redused.

In addition, especially in the embodiment shown in FIGS. 6 and 7, the first journal 33 is so formed that the length thereof along the rotation axis of the balancer shaft 30 is larger than that of the third journal 34 and the diameter thereof is larger than that of the third journal 34. Accordingly, even in a condition wherein the first portion 30b of the balancer shaft 30, which is longer than the second portion 30a of the balancer shaft 30, receives a larger bending moment compared with the second portion 30a of the balancer shaft 30 and therefore the first journal 33 and the first bearing 17 supporting the first journal 33 are burdened a larger load compared with the third journal 34 and the third bearing 18 supporting the third journal 34, a load imposed on a unit area on the first journal 33 and a load imposed on a unit area on the third journal 34 are equalized with each other. Consequently, wears caused respectively on the first and third journals 33 and 34 are also equalized with each other, so that the durability of the balancer shaft 30 is improved.

Further, the second journal 35 is provided with its radius ($L_1$) larger than the maximum distance ($L_2$) from the rotation axis of the balancer shaft 30 to the outer surface of the balance weight part 31 and therefore the second bearing 19 is simplified in construction. That is, the second bearing 19 can support surely the second journal 35 which is merely inserted thereinto through the bearing metal 22 without using a bearing cap or the like. In addition to this, since the third journal 34 is provided with the diameter thereof smaller than that of the second journal 35, the balancer shaft 30 is easily engaged with the cylinder block 11 in such a manner that the first, second and third journals 33, 35 and 34 are inserted correctly into the first, second and third bearings 17, 19 and 18, respectively, by putting the same into the cylinder block 11 with the third journal 34 at the front end thereof. Besides, since the diameter of the third journal 34 is selected to be relatively small, the outer surface of the third journal 34 moves to slide on the bearing metal 21 in the third bearing 18 at relatively low speed, so that wear and heat caused on the third journal 34 are reduced and driving power loss is diminished at the third journal 34.

Then, in the embodiment shown in FIGS. 6 and 7, the balance weight part 31 is so formed that the first section 31b thereof which is disposed between the first and second journals 33 and 35 is weightier than the second section 31a thereof which is disposed between the second and third journals 35 and 34, and therefore the second journal 35 is supported by the second journal 35 in a desirable manner when the balancer shaft 30 is revolved at relatively high speed, as described below.

Figure 8:
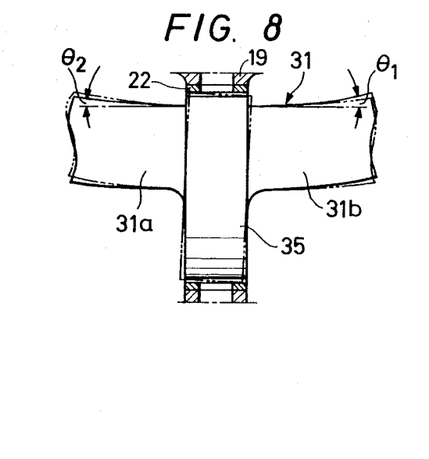
FIG. 8 is a schematic illustration used for explanation of the operation of the embodiment shown in FIGS. 6 and 7.

During the revolution of the balancer shaft 30 at relatively high speed, centrifugal force resulting from the eccentric revolution of the balance weight part 31 works on the balancer shaft 30 so as to cause each of the first and second portions 30b and 30a of the balancer shaft 30 to bend. Under the condition of such bendings of the first and second portions 30b and 30a extending from the second journal 35 to the first journal 33 and from the second journal 35 to the third journal 34, respectively, the amount of maximum flexion on the first portion 30b of the balancer shaft 30 becomes larger than the amount of maximum flexion on the second portion 30a of the balancer shaft 30. Consequently, as shown in FIG. 8, a bending angle $\theta_1$ of the first portions 30b of the balancer shaft 30 at one side of the second journal 35 and a bending angle $\theta_2$ of the second portions 30a of the balancer shaft 30 at the other side of the second journal 35 are made substantially equal to each other, and as a result, the second journal 35 is prevented from coming undesirably into contact with the bearing metal 22 in the second bearing 19 and being subjected to undesirable partial wear or seizure caused thereon.

Figure 9:
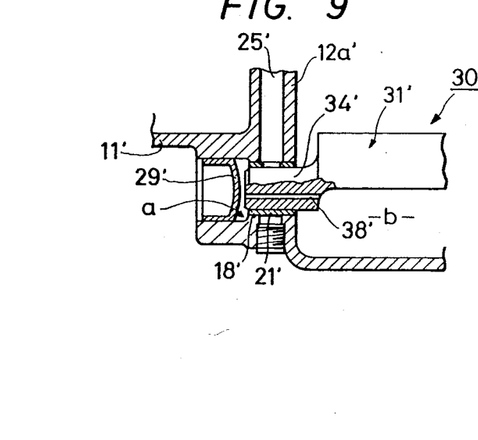
FIG. 9 is a schematic partial cross-sectional view showing a part of another embodiment of balancer shaft used in a multicylinder engine according to the present invention.

FIG. 9 shows a part of another embodiment of the balancer shaft according to the present invention. In this embodiment, a third bearing 18' provided in a bulkhead 12a' of a cylinder block 11' for supporting through a bearing metal 21' a third journal 34' provided on a balance weight part 31' of a balancer shaft 30', which embodies a balancer shaft according to the present invention, is connected with a hole a which is provided on the cylinder block 11' to lead to the outside of the cylinder block 11'. The hole a is closed up by a blind plug 29'.

In such a configuration, since a closed small space is formed in the hole a, a lubricating oil supplied through an oil passage 25' provided in the bulkhead 12a' to the bearing metal 21' in the third bearing 18' flows out only into a space b in the cylinder block 11' and therefore it is feared that the third journal 34' is not sufficiently lubricated at a portion thereof facing the blind plug 29'. Accordingly, in this embodiment, the third journal 34' is provided therein with a communicating passage 38' for connecting therethrough the space b and the small space formed in the hole a, so that the lubricating oil supplied from the oil passage 25' flows out equally into both the space b and the small space in the hole a.

What is claimed is:

1. A balancer shaft for use in multicylinder engine, which is sustained by a cylinder block of the engine to be arranged in substantial parallel with a crank shaft in the engine and driven to rotate by the crank shaft, the balancer shaft comprising:
    a balance weight part formed to be eccentric in relation to a rotation axis of the balancer shaft and disposed at a central area in the cylinder block in a direction along an alignment of cylinders,
    an elongated shaft part having one end portion connected with one end portion of the balance weight part and extending from the balance weight part in the direction of the alignment of cylinders with an axis coinciding with the rotation axis of the balancer shaft, and
    first, second and third journals provided on the other end portion of the elongated shaft part, a central portion of the balance weight part and the other end portion of the balance weight part, respectively, so that the balancer shaft journals by first, second and third bearing portions provided in the engine;
    wherein a first portion of the balancer shaft extending from the second journal to the first journal is longer than a second portion of the balancer shaft extending from the second journal to the third journal.

2. A balancer shaft for use in a mutlicylinder engine, which is sustained by a cylinder block of the engine to be arranged in substantial parallel with a crank shaft in the engine and driven to rotate by the crank shaft, the balancer shaft comprising:
    a balance weight part formed to be eccentric in relation to a rotation axis of the balancer shaft and disposed at a central area in the cylinder block in the direction along the alignment of cylinders,
    an elongated shaft part having one end portion connected with one end portion of said balance weight part and extending therefrom in the direction along the alignment of cylinders with an axis coinciding with the rotation axis of the balancer shaft, a driving device provided on the other end portion of said elongated shaft part for transmitting the rotation of the crank shaft to the balancer shaft, a first journal provided on the other end portion of said elongated shaft part to be supported to turn by a first bearing portion provided in the engine, a second journal provided on a central portion of said balance weight part to be supported to turn by a second bearing portion provided in the engine, and a third journal provided on the other end portion of said balance weight part to be supported to turn by a third bearing portion provided in the engine;

said first journal being supported by the first bearing portion provided in an end wall of the cylinder block in which first to fourth cylinders are arranged in line, said second journal being supported by the second bearing portion provided in a first bulkhead located between the second and third cylinders in the cylinder block, and said third journal being supported by the third bearing portion provided in a second bulkhead adjacent to said first bulkhead in the cylinder block, a first portion of the balancer shaft extending from said second journal to said first journal being longer than a second journal of the balancer shaft extending from said second journal to said third journal, and said third journal is provided with the radius thereof smaller than a maximum distance from the rotation axis of the balancer shaft to an outer surface of said balance weight part.

3. A balancer shaft according to claim 2, wherein said first journal is so formed that at least one of the dimensions of said first journal selected from the group consisting of the length of said first journal along the rotation axis of the balancer shaft and the diameter is larger than the corresponding length of said third journal.

4. A balancer shaft according to claim 3, wherein said balance weight part is so formed that a first section thereof disposed between said first and second journals is weightier than a second section thereof disposed between said second and third journals.

5. A balancer shaft according to claim 4, wherein said second journal is provided with the radius thereof larger than said maximum distance from the rotation axis of the balancer shaft to the outer surface of said balance weight part and said first section of the balance weight part is longer than said second section of the balance weight part, so that the balance shaft is made appropriate to be inserted into the cylinder block in the direction along the rotation axis thereof.

6. A balancer shaft according to claim 2, wherein said balance weight part is so formed that a first section thereof disposed between said first and second journals is weightier than a second section thereof disposed between said second and third journals.

7. A balancer shaft according to claim 2, wherein said second journal is provided with the diameter thereof larger than that of said third journal.

8. A balancer shaft according to claim 7, wherein said second journal is provided with the radius thereof larger than said maximum distance from the rotation axis of the balancer shaft to the outer surface of said balance weight part and a first section of said balance weight part disposed between said first and second journals is weightier than a second section of said balance weight part disposed between said second and third journals, so that the balance shaft is made appropriate to be inserted into the cylinder block in the direction along the rotation axis thereof.

9. A balancer shaft for use in a multicylinder engine, which is sustained by a cylinder block of the engine to be arranged in substantial parallel with a crank shaft in the engine and driven to rotate by the crank shaft, which is used as each of a couple of shafts disposed to face each other with the crank shaft between and rotate in the respective directions opposite to each other at speed being twice as high as the speed of rotation of the crank shaft in the cylinder block forming therein four cylinders arranged in line, and which is inserted in the cylinder block through an end wall thereof so as to extend to pass through bulkheads provided in the cylinder block, the balancer shaft comprising:

a balance weight part formed to be eccentric in relation to a rotation axis of the balancer shaft and disposed at a central area in the cylinder block in the direction along the alignment of cylinders, an elongated shaft part having one end portion connected with one end portion of said balance weight part and extending therefrom in the direction along the alignment of cylinders with an axis coinciding with the rotation axis of the balancer shaft, a driving device provided on the other end portion of said elongated shaft part for transmitting the rotation of the crank shaft to the balancer shaft, a first journal provided on the other end portion of said elongated shaft part to be supported to turn by a first bearing portion provided in the engine, a second journal provided on a central portion of said balance weight part to be supported to turn by a second bearing portion provided in the engine, and a third journal provided on the other end portion of said balance weight part to be supported to turn by a third bearing portion provided in the engine;

said first journal being supported by the first bearing portion provided in the end wall of the cylinder block, said driving device including a gear mounted on the other end portion of said elongated shaft part projecting through the end wall to the outside, said second journal being supported by the second bearing portion provided in a first bulkhead located between the second and third cylinders, said third journal being supported by the third bearing portion provided in a second bulkhead located between the third and fourth cylinders and is so formed that at least one of the dimensions of said third journal selected from the group consisting of the length of said third journal along the rotation axis of the balancer shaft and the diameter is smaller than the corresponding dimension of said first journal, and said balance weight part has a first section and a second section, said second section elongating from said second journal to said third journal and being slightly shorter than said first section, said first section of the balance weight part being so formed that a maximum distance from the rotation axis of the balancer shaft to an outer surface of said first section is smaller than the diameter of said first journal, and said second section of the balance weight part being so formed that a maximum distance from the rotation axis of the balancer shaft to an outer surface of said second section is smaller than the diameter of said second journal.

10. A balancer shaft for use in a multicylinder engine, which is sustained by a cylinder block of the engine to be arranged in substantial parallel with a crank shaft in the engine and driven to rotate by the crank shaft, which is used as each of a couple of shafts disposed to face each other with the crank shaft between and rotate in the respective directions opposite to each other at speed being twice as high as the speed of rotation of the crank shaft in the cylinder block forming therein four cylinders arranged in line, and which is inserted in the cylinder block through an end wall thereof so as to extend to pass through bulkheads provided in the cylinder block, the balancer shaft comprising:

a balance weight part formed to be eccentric in relation to a rotation axis of the balancer shaft and disposed at a central area in the cylinder block in the direction along the alignment of cylinders, an elongated shaft part having one end portion connected with one end portion of said balance weight part and extending therefrom in the direction along the alignment of cylinders with an axis coinciding with the rotation axis of the balancer shaft, a driving device provided on the other end portion of said elongated shaft part for transmitting the rotation of the crank shaft to the balancer shaft, a first journal provided on the other end portion of said elongated shaft part to be supported to turn by a first bearing portion provided in the engine, a second journal provided on a central portion of said balance weight part to be supported to turn by a second bearing portion provided in the engine, and a third journal provided on the other end portion of said balance weight part to be supported to turn by a third bearing portion provided in the engine;

said first journal being supported by the first bearing portion provided in the end wall of the cylinder block, said driving device including a gear mounted on the other end portion of said elongated shaft part projecting through the end wall to the outside, said second journal being supported by the second bearing portion provided in a first bulkhead located between the second and thrid cylinders, said third journal being supported by the third bearing portion provided in a second bulkhead located between the third and fourth cylinders and is provided with a diameter smaller than the diameter of said second journal, and said balance weight part having a first section and a second section elongating from said second journal to said third journal and being slightly shorter than said first section, said second section of the balance weight part being so formed that a maximum distance from the rotation axis of the balancer shaft to an outer surface of said second section is larger than the diameter of said third journal but smaller than the diameter of said second journal.

* * * * *